US010098169B2

(12) United States Patent
Adachi et al.

(10) Patent No.: US 10,098,169 B2
(45) Date of Patent: Oct. 9, 2018

(54) USER TERMINAL AND COMMUNICATION CONTROL METHOD

(71) Applicant: KYOCERA CORPORATION, Kyoto-shi, Kyoto (JP)

(72) Inventors: Hiroyuki Adachi, Kawasaki (JP); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 15/047,948

(22) Filed: Feb. 19, 2016

(65) Prior Publication Data
US 2016/0174279 A1 Jun. 16, 2016

Related U.S. Application Data

(63) Continuation of application No. PCT/JP2015/063259, filed on May 8, 2015.
(Continued)

(51) Int. Cl.
*H04W 56/00* (2009.01)
*H04W 76/14* (2018.01)
*H04W 8/00* (2009.01)

(52) U.S. Cl.
CPC .......... *H04W 76/14* (2018.02); *H04W 8/005* (2013.01); *H04W 56/0015* (2013.01)

(58) Field of Classification Search
CPC ... H04W 56/00; H04W 76/023; H04W 92/18; H04W 76/02; H04W 8/005; H04W 72/048
See application file for complete search history.

(56) References Cited

U.S. PATENT DOCUMENTS

| | | | |
|---|---|---|---|
| 2012/0135739 A1* | 5/2012 | Paterson | C07K 14/195 455/436 |
| 2014/0112194 A1* | 4/2014 | Novlan | H04W 8/005 370/254 |

(Continued)

FOREIGN PATENT DOCUMENTS

| | | |
|---|---|---|
| EP | 3030017 A1 | 6/2016 |
| JP | 2011-176549 A | 9/2011 |

(Continued)

OTHER PUBLICATIONS

3rd Generation Partnership Project; Technical Specification Group RAN; Study on LTE Device to Device Proximity Services-Radio Aspects; (Release 12); 3GPP TR 36.843 V1.0.0, Nov. 2013; pp. 1-32; 3GPP Organizational Partners.

(Continued)

*Primary Examiner* — Anez Ebrahim

(57) ABSTRACT

A user terminal supports a D2D proximity service enabling a direct device-to-device communication without passing through a network. The user terminal includes a controller configured to select one of a plurality of other user terminals as a D2D synchronization source and to synchronize to a D2D synchronization signal transmitted by the D2D synchronization source, when the user terminal receives D2D synchronization signals transmitted by the plurality of other user terminals in a case where the user terminal is out of network coverage. The controller stops transmission of a predetermined D2D synchronization signal in response to selecting the other user terminal as the D2D synchronization source, when the user terminal is transmitting the predetermined D2D synchronization signal in a case where the user terminal is out of network coverage.

6 Claims, 9 Drawing Sheets

Related U.S. Application Data

(60) Provisional application No. 61/990,900, filed on May 9, 2014.

(56) References Cited

U.S. PATENT DOCUMENTS

| | | | |
|---|---|---|---|
| 2014/0357269 A1* | 12/2014 | Zhou | H04W 8/005 455/434 |
| 2015/0099511 A1* | 4/2015 | Lindoff | H04W 76/023 455/426.1 |
| 2015/0230160 A1* | 8/2015 | Lin | H04W 48/16 370/252 |
| 2015/0271856 A1 | 9/2015 | Tong et al. | |

FOREIGN PATENT DOCUMENTS

| | | |
|---|---|---|
| JP | 2013-176137 A | 9/2013 |
| WO | 2014/051126 A1 | 4/2014 |
| WO | 2015/015924 A1 | 2/2015 |

OTHER PUBLICATIONS

Noikia, NSN; "Synchronization Procedure for D2D Communication and Discovery"; 3GPP TSG-RAN WG1 Meeting #77; R1-142453; May 19-23, 2014;pp. 1-7; Seoul, Korea.

International Search Report (Form PCT/ISA/210) dated Jul. 7, 2015 and issued for International Patent Application No. PCT/JP2015/063259.

Office Action issued for the corresponding Japanese Patent Application No. JP2016-517930, dated Dec. 20, 2016.

Catt, "Discussion on D2D synchronization procedure", R1-141198, 3GPP TSG RAN WG1 Meeting #76bis, Mar. 31-Apr. 4, 2014, 6 pages, 3GPP, Shenzhen, China.

Ericsson, "Frame Structure for D2D—Enabled LTE Carriers", R1-141387, 3GPP TSG RAN WG1 Meeting #76bis, Mar. 31-Apr. 4, 2014, 4 pages, 3GPP, Shenzhen, China.

LG Electronics Inc, "Synchronization Refrence selection", R2-141721, 3GPP TSG-RAN WG2 #85bis, Mar. 31-Apr. 4, 2014, 3 pages, 3GPP, Valencia, Spain.

Extended European Search Report (EPO Form 1507S) issued in European Patent Application No. 15789247.2, dated Nov. 2, 2017.

Intel Corporation, "Discussion on D2DSS Physical Structure", 3GPP TSG RAN WG1 Meeting #76bis, R1-141166, Mar. 31-Apr. 4, 2014, Shenzhen, China.

Nokia, NSN, Discussion on D2D Synchronization Procedure for Communication and Discovery, 3GPP TSG-RAN WG1 Meeting #76bis, R1-141542, Mar. 31-Apr. 4, 2014, Shenzhen, China.

Huawai, Hisilicon, "Design Considerations for D2DSS", 3GPP TSG RAN WG1 Meeting #76bis, R1-141595, Mar. 31-Apr. 4, 2014, Shenzhen, China.

Institute for Information Industry, "Performance of D2D Synchronization Source Selection and D2DSS Transmission", 3GPP TSG-RAN WG1 Meeting #76bis, R1-141498, Mar. 31-Apr. 4, 2014, Shenzhen, China.

* cited by examiner

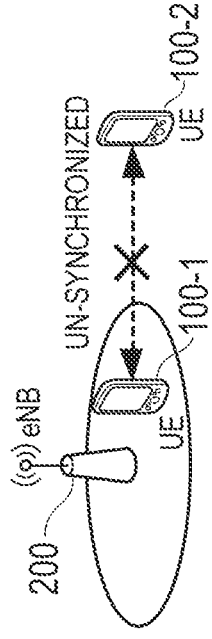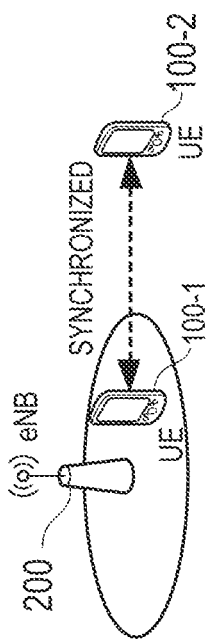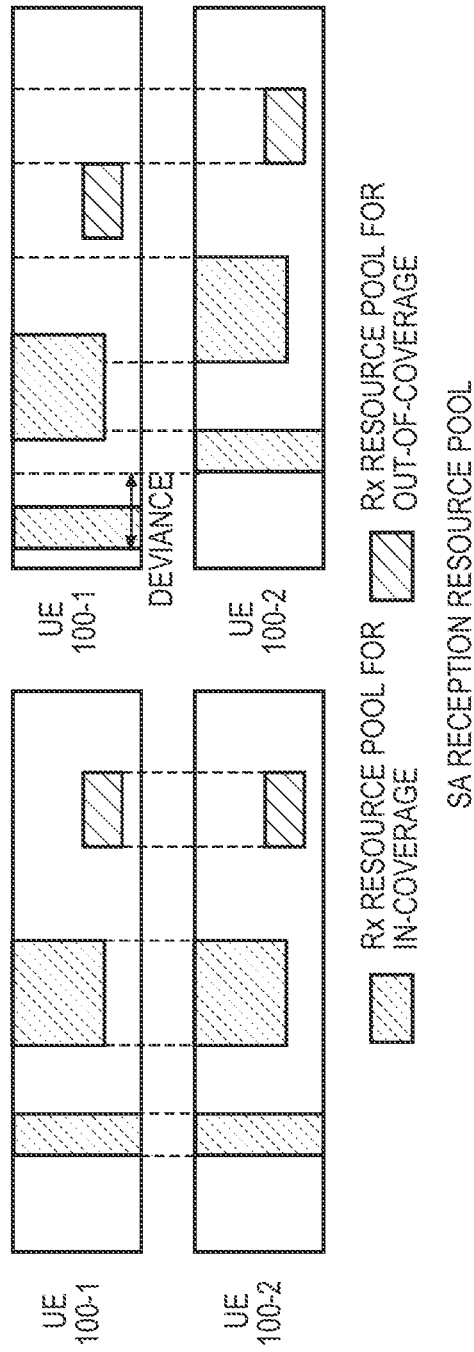

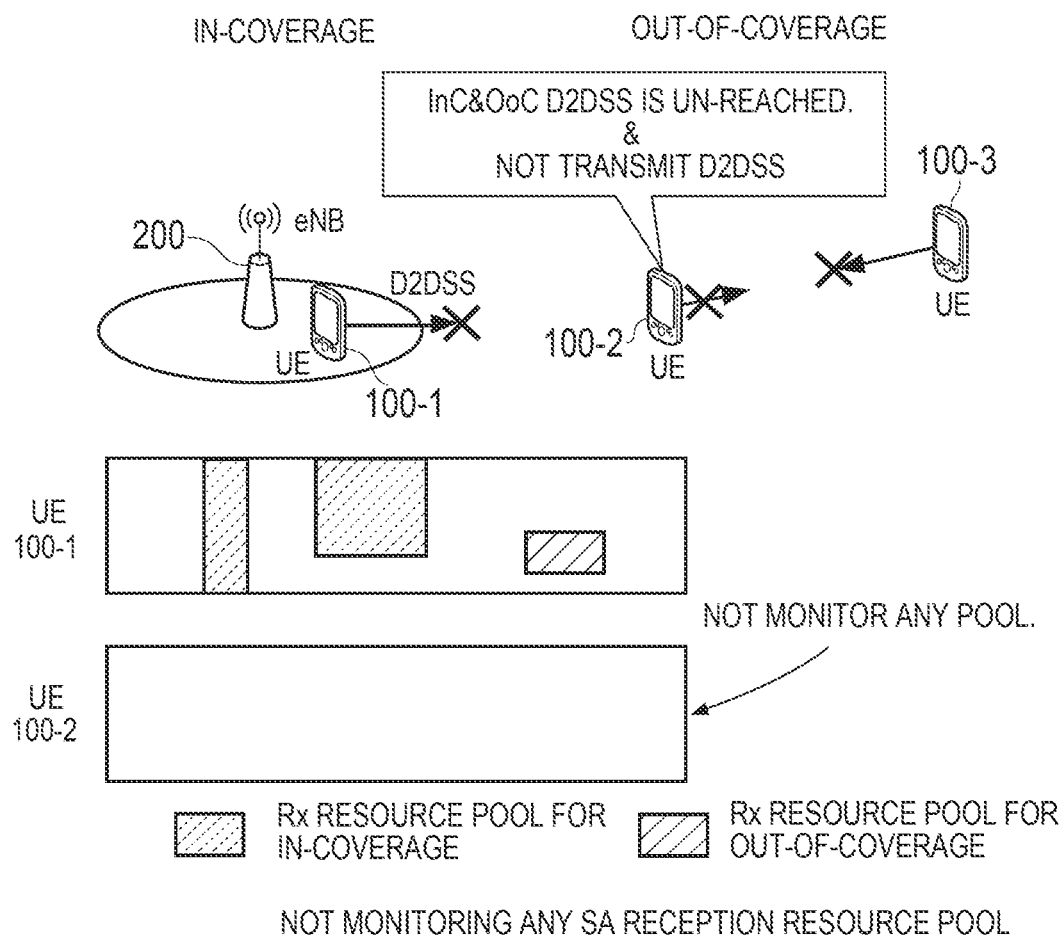

USER TERMINAL AND COMMUNICATION CONTROL METHOD

RELATED APPLICATIONS

This application is a continuation application of international application PCT/JP2015/063259, filed May 8, 2015, which claims benefit of U.S. provisional application 61/990,900, filed May 9, 2014, the entirety of both applications hereby expressly incorporated by reference.

TECHNICAL FIELD

The present disclosure relates to a user terminal and a communication control method which are used in a mobile communication system.

BACKGROUND

In 3GPP (3rd Generation Partnership Project); which is a project aiming to standardize a mobile communication system, the introduction of a Device-to-Device (D2D) proximity service is discussed as a new function on and after Release 12 (see Non Patent Document 1).

The D2D proximity service (D2D ProSe) is a service enabling direct communication without passing through a network within a synchronization cluster including plural synchronized user terminals. The D2D proximity service includes a discovery process (Discovery) in which a proximal terminal is discovered and a communication process (Communication) in which direct communication is performed.

PRIOR ART DOCUMENTS

Non Patent Document

[Non Patent Document 1] 3GPP technical report "TR 36.843 V1.0.0" Jan. 16, 2014

SUMMARY

One object of the present disclosure is to provide a user terminal and a communication control method which are capable of appropriately using a D2D proximity service even in out of network coverage.

A user terminal according to one embodiment supports a D2D proximity service enabling a direct device-to-device communication without passing through a network. The user terminal includes a controller configured to select one of a plurality of other user terminals as a D2D synchronization source, and to synchronize to a D2D synchronization signal transmitted by the D2D synchronization source, when the user terminal receives D2D synchronization signals transmitted by the plurality of other user terminals in a case where the user terminal is out of network coverage.

In one embodiment, the plurality of other user terminals are user terminals which are out of network coverage.

In one embodiment, the controller stops a transmission of a predetermined D2D synchronization signal in response to selecting another user terminal as the D2D synchronization source, when the user terminal is transmitting the predetermined D2D synchronization in a case where the user terminal is out of network coverage.

In one embodiment, the plurality of other user terminals are user terminals which are in network coverage.

In one embodiment, the controller selects the D2D synchronization source based on at least one of signal strength and priority which correspond to each of the plurality of other user terminals.

In one embodiment, the controller generates a D2D synchronization signal by reference to another D2D synchronization signal transmitted by another user terminal which is in network coverage, and transmits the generated D2D synchronization signal.

In one embodiment, the controller omits a monitor of a reception state in a D2D communication resource pool, when the user terminal is not receiving a D2D synchronization signal from another user terminal and is not transmitting a D2D synchronization signal, in a case where the user terminal is out of network coverage.

In one embodiment, a D2D communication resource pool is divided into first radio resources and second radio resources. The first radio resources are used for in network coverage, and the second radio resources are used for out of network coverage. The controller monitors a reception state for only the second radio resources among the D2D communication resource pool, when the user terminal is not receiving a D2D synchronization signal transmitted by another user terminal which is in network coverage and a predetermined condition is satisfied. The predetermined condition is at least one of the following: the user terminal receives a D2D synchronization signal transmitted by another user terminal which is out of network coverage; and the user terminal is transmitting a D2D synchronization signal.

In one embodiment, a D2D communication resource pool is divided into first radio resources and second radio resources. The first radio resources are used for in network coverage, and the second radio resources are used for out of network coverage. The controller monitors a reception state in each of the first and second radio resources, when the user terminal receives a D2D synchronization signal transmitted by another user terminal which is in network coverage.

In one embodiment, the controller monitors a reception state for only some radio resources among the first radio resources when those particular radio resources are designated by another user terminal which is in network coverage.

A communication control method according to one embodiment is a method in a user terminal which supports a D2D proximity service enabling direct device-to-device communication without passing through a network. The communication control method includes selecting one of plurality of other user terminals as a D2D synchronization source and synchronizing to a D2D synchronization signal transmitted by the D2D synchronization source, when the user terminal receives D2D synchronization signals transmitted by the plurality of other user terminals when the user terminal is out of network coverage.

BRIEF DESCRIPTION OF DRAWINGS

FIG. 7(A) and FIG. 7(B) are configuration diagrams of a D2D proximity service according to the first embodiment.
FIG. 8 is a configuration diagram of the D2D proximity service according to the first embodiment.

DETAILED DESCRIPTION

Overview of Embodiments

Figure 1:
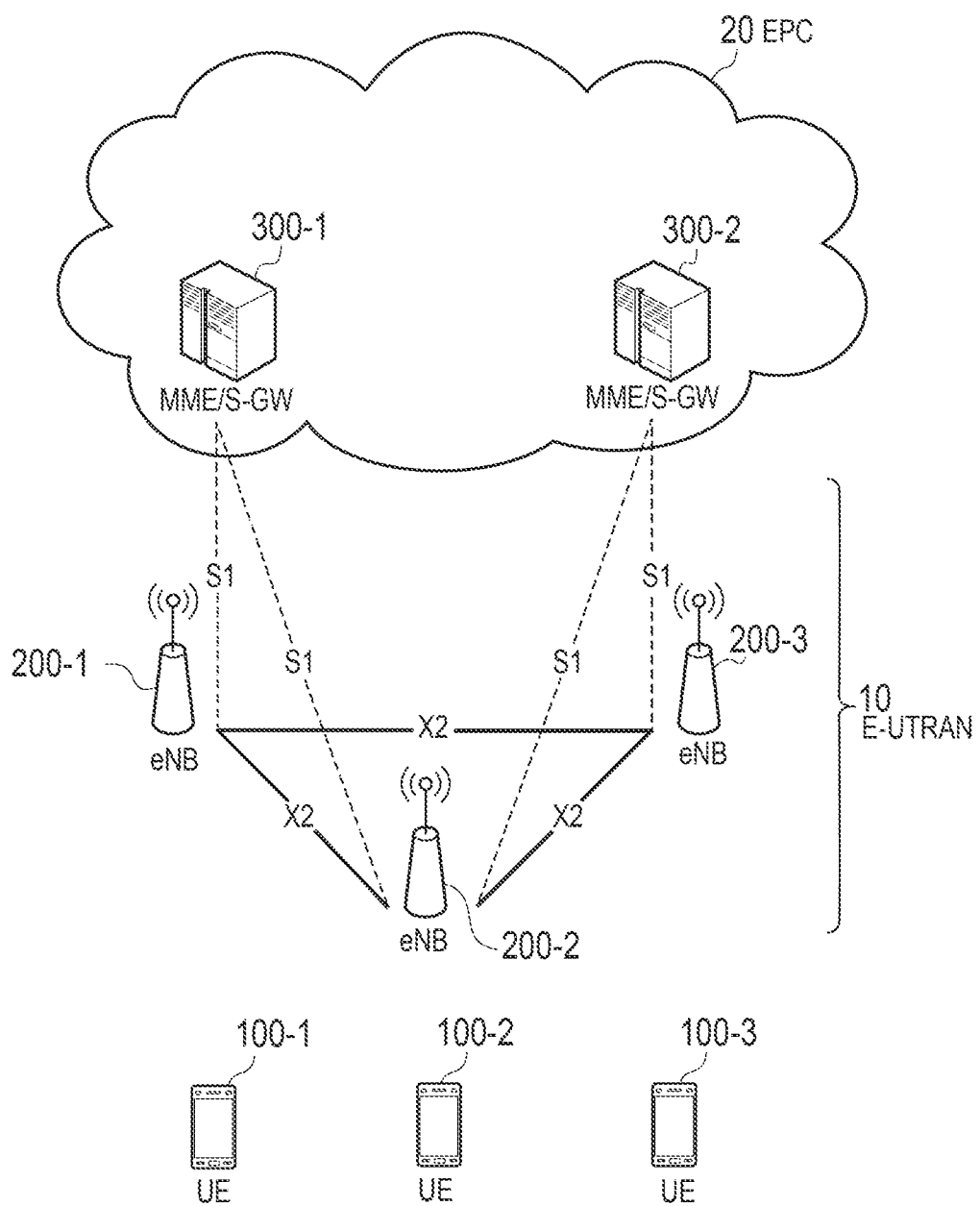
FIG. 1 is a configuration diagram of an LTE system.

In a first embodiment, a user terminal supports a D2D proximity service enabling direct device-to-device communication without passing through a network. The user terminal comprises: a storage configured to store therein information on control radio resources for receiving a control signal for the D2D proximity service; a transmitter configured to transmit a synchronization signal for the D2D proximity service; and a controller configured to monitor a reception state of the synchronization signal from another user terminal and a reception state of the control signal in the control radio resources. However, the controller does not monitor the reception state of the control radio resources when out of network coverage and when the controller does not receive the synchronization signal from the other user terminal and the transmitter does not transmit the synchronization signal. Instead the controller regularly monitors the reception state of the synchronization signal.

In a second embodiment, a user terminal is similar to the user terminal according to the first embodiment, but the control radio resources are divided into first radio resources for in network coverage and second radio resources for out of network coverage. When the user terminal receives the synchronization signal transmitted by the other user terminal which is out of network coverage or when the transmitter transmits the synchronization signal and when the user terminal does not receive the synchronization signal transmitted by the other user terminal which is in network coverage, then the controller monitors only the reception state of the second radio resources in the control radio resources.

In the user terminal according to the second embodiment, when the user terminal receives the synchronization signal transmitted by a plurality of other user terminals which are out of network coverage, the user terminal may synchronize to the synchronization signal transmitted by one user terminal among the plurality of other user terminals which are out of network coverage.

In the user terminal according to the second embodiment, in a case where the user terminal transmits the synchronization signal, when the user terminal receives the synchronization signal transmitted by another user terminal which is out of network coverage, the user terminal may stop the transmission of the synchronization signal.

A user terminal according to a third embodiment is the user terminal according to the first embodiment, wherein the control radio resources are divided into first radio resources for in network coverage and second radio resources for out of network coverage. When the user terminal receives the synchronization signal transmitted by another user terminal which is in network coverage, the controller is characterized by monitoring reception states of the first radio resources and the second radio resources.

In the user terminal according to the third embodiment, the user terminal may monitor a reception state of a part of the first radio resources designated by the other user terminal which is in network coverage.

In the user terminal according to the third embodiment, when the user terminal receives synchronization signals transmitted by a plurality of other user terminals which are in network coverage, the user terminal may synchronize to the synchronization signal transmitted by one user terminal among the plurality of other user terminals which are in network coverage.

In the user terminal according to the third embodiment, the user terminal may determine the other user terminal to which the user terminal synchronizes, based on at least one of the following: a signal strength of the synchronization signal, a priority of the synchronization signal, and a size of the control radio resources.

In the user terminal according to the third embodiment, in a case where the user terminal receives the synchronization signal transmitted by the other user terminal in network coverage, when the user terminal receives a synchronization signal from a user terminal which is out of network coverage, the user terminal may refer to the synchronization signal transmitted by the other user terminal in network coverage to generate the synchronization signal and may transmit the generated synchronization signal to the user terminal which is out of network coverage.

In the user terminal according to the third embodiment, the user terminal may determine whether to generate the synchronization signal and transmit the generated synchronization signal to other user terminals which are out of network coverage, based on a remaining battery amount.

In the user terminal according to the first to third embodiments, the control signal may be a control signal for designating a radio resource used for exchanging data of a D2D proximity service.

In the user terminal according to the first to third embodiments, the control signal may be a control signal for discovering other user terminals.

A communication control method according to the first to third embodiments is a method in a D2D proximity service in which a user terminal is capable of performing direct device-to-device communication without passing through a network. The method includes: a step of storing, by the user terminal, information on control radio resources for receiving a control signal for the D2D proximity service; a step of transmitting, by the user terminal, a synchronization signal for the D2D proximity service; and a step of monitoring, by the user terminal, a reception state of the synchronization signal from other user terminals and a reception state of the control signal in the control radio resources, wherein when the user terminal does not receive, out of network coverage, the synchronization signal from another user terminal and does not transmit the synchronization signal, the user terminal does not monitor the reception state of the control radio resources and regularly monitors the reception state of the synchronization signal.

First Embodiment

A first embodiment will be described by using, as an example, an LTE system based on 3GPP standards as a mobile communication system below.

(System Configuration)

FIG. 1 is a configuration diagram of an LTE system according to a first embodiment. As illustrated in FIG. 1, the LTE system according to the first embodiment includes UE (User Equipment) 100, E-UTRAN (Evolved-UMTS Terrestrial Radio Access Network) 10, and EPC (Evolved Packet Core) 20.

The UE 100 corresponds to a user terminal. The UE 100 is a mobile communication device, which performs radio communication with a cell (a serving cell in a case where the UE 100 is a connected state) formed by the eNB 200. The configuration of the UE 100 will be described later.

The E-UTRAN 10 corresponds to a radio access network. The E-UTRAN 10 includes eNB 200 (an evolved Node-B). The eNB 200 corresponds to a base station. The eNBs 200 are connected mutually via an X2 interface. The configuration of the eNB 200 will be described later.

The eNB 200 manages one or a plurality of cells, and performs radio communication with the UE 100 that establishes a connection with a cell of the eNB 200. The eNB 200 has a radio resource management (RRM) function, a routing function for user data, a measurement control function for mobility control and scheduling and the like. The "cell" is used as a term indicating a smallest unit of a radio communication area, and is also used as a term indicating a function of performing radio communication with the UE 100.

The EPC 20 corresponds to a core network. The EPC 20 includes MME (Mobility Management Entity)/S-GW (Serving-Gateway) 300. The MME performs different types of mobility control and the like for the UE 100. The S-GW performs transfer control of the user data. The MME/S-GW 300 is connected to the eNB 200 via an S1 interface.

Figure 2:
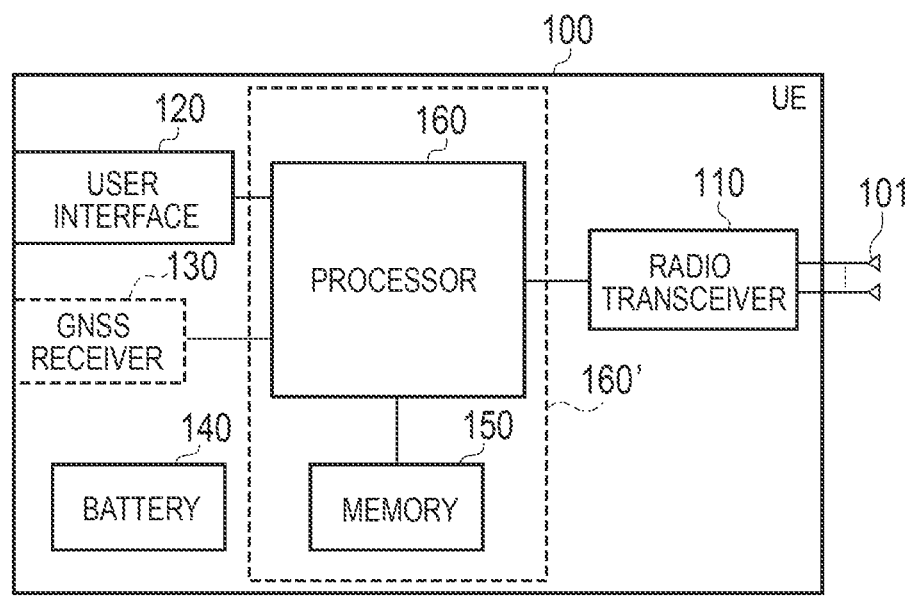
FIG. 2 is a block diagram of a User Equipment (UE).

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 corresponds to storage, and the processor 160 corresponds to a controller. The UE 100 may not necessarily have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The radio transceiver 110 converts a baseband signal (a transmission signal) output from the processor 160 into a radio signal and transmits the radio signal from the antenna 101. Furthermore, the radio transceiver 110 converts a radio signal received by the antenna 101 into a baseband signal (a reception signal) and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100 and outputs the received signal to the processor 160. The battery 140 accumulates a power to be supplied to each block of the UE 100.

The memory 150 stores a program to be executed by the processor 160 and information to be used for processing by the processor 160. The processor 160 includes a baseband processor that performs modulation and demodulation, encoding and decoding and the like on the baseband signal, and a CPU (Central Processing Unit) that performs various types of processes by executing the program stored in the memory 150. The processor 160 may further include a codec that performs encoding and decoding on sound and video signals. The processor 160 executes various types of processes and various types of communication protocols described later.

Figure 3:
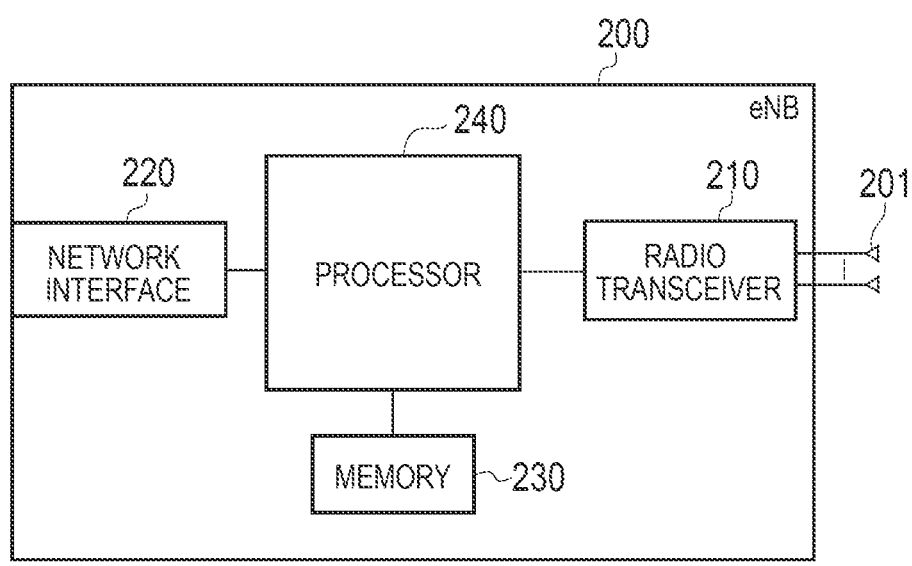
FIG. 3 is a block diagram of an evolved node-B (eNB).

FIG. 3 is a block diagram of the eNB 200. As illustrated in FIG. 3, the eNB 200 includes a plurality of antennas 201, a radio transceiver 210, a network interface 220, a memory 230, and a processor 240.

The antenna 201 and the radio transceiver 210 are used to transmit and receive a radio signal. The radio transceiver 210 converts a baseband signal (a transmission signal) output from the processor 240 into a radio signal and transmits the radio signal from the antenna 201. Furthermore, the radio transceiver 210 converts a radio signal received by the antenna 201 into a baseband signal (a reception signal) and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for processing by the processor 240. The processor 240 includes a baseband processor that performs modulation and demodulation, encoding and decoding and the like on the baseband signal and a CPU that performs various types of processes by executing the program stored in the memory 230. The processor 240 executes various types of processes and various types of communication protocols described later.

Figure 4:
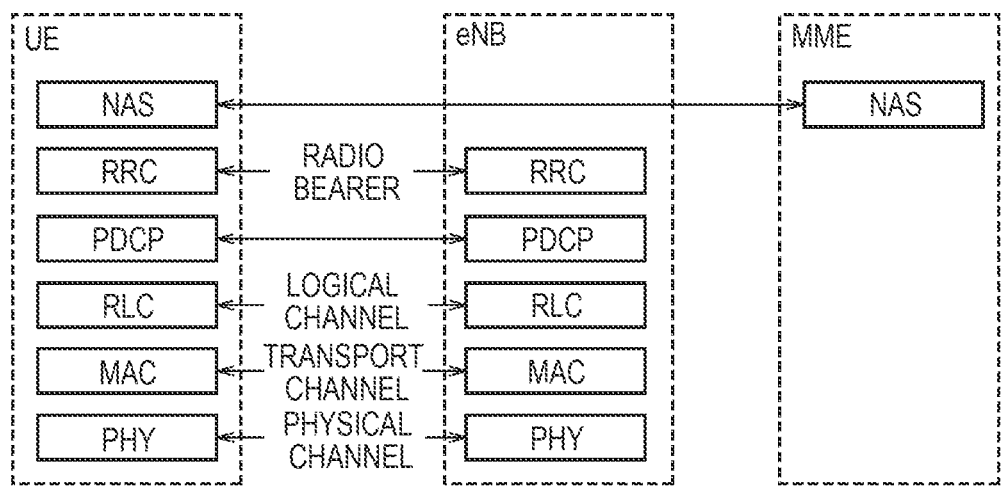
FIG. 4 is a protocol stack diagram of a radio interface.

FIG. 4 is a protocol stack diagram of a radio interface in the LTE system. As illustrated in FIG. 4, the radio interface protocol is classified into a first layer to a third layer of an OSI reference model, such that the first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, user data and control signals are transmitted via a physical channel.

The MAC layer performs priority control of data, a retransmission process by a hybrid ARQ (HARQ), and the like. Between the MAC layer of the UE 100 and the MAC layer of the eNB 200, user data and control signals are transmitted via a transport channel. The MAC layer of the eNB 200 includes a scheduler for determining a transport format (a transport block size and a modulation and coding scheme) of an uplink and a downlink, and resource blocks to be assigned to the UE 100.

The RLC layer transmits data to an RLC layer of a reception side by using the functions of the MAC layer and the physical layer. Between the RLC layer of the UE 100 and the RLC layer of the eNB 200, user data and control signals are transmitted via a logical channel.

The PDCP layer performs header compression and decompression, and encryption and decryption.

The RRC layer is defined only in a control plane that handles control signals. Between the RRC layer of the UE 100 and the RRC layer of the eNB 200, a control signal (an RRC message) for various types of settings is transmitted. The RRC layer controls a logical channel, a transport channel, and a physical channel according to the establishment, re-establishment, and release of a radio bearer. When there is a connection (an RRC connection) between the RRC of the UE 100 and the RRC of the eNB 200, the UE 100 is in an RRC connected state. Otherwise, the UE 100 is in an RRC idle state.

An NAS (Non-Access Stratum) layer positioned above the RRC layer performs session management, mobility management and the like.

Figure 5:
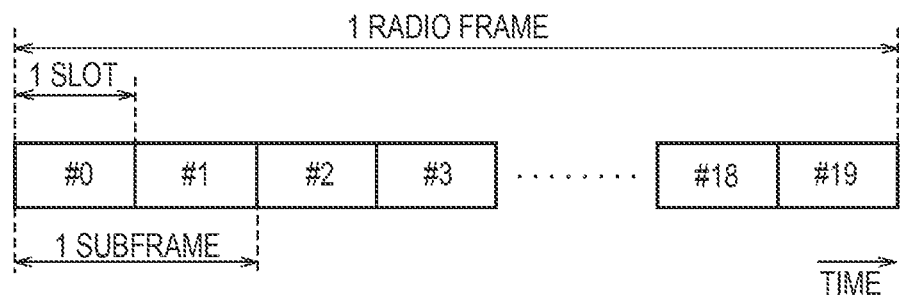
FIG. 5 is a configuration diagram of a radio frame.

FIG. 5 is a configuration diagram of a radio frame used in the LTE system. In the LTE system, OFDMA (Orthogonal Frequency Division Multiple Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction.

Of the radio resources (time and frequency resources) assigned to the UE 100, a frequency resource can be identified by a resource block and a time resource can be identified by a subframe (or a slot).

In the downlink, an interval of several symbols at the head of each subframe is a region used as a physical downlink control channel (PDCCH) for mainly transmitting a control signal. Furthermore, the remaining interval of each subframe is a region available as a physical downlink shared channel (PDSCH) for mainly transmitting user data.

In the uplink, both ends in the frequency direction of each subframe are regions used as a physical uplink control channel (PUCCH) for mainly transmitting a control signal. The remaining portion in each subframe is a region available as a physical uplink shared channel (PUSCH) for mainly transmitting user data.

(D2D Proximity Service)

A summary of a D2D proximity service (D2D ProSe) will be described below.

An LTE system according to the first embodiment supports the D2D proximity service. The D2D proximity service (D2D ProSe) is a service enabling direct UE-to-UE communication within a synchronization cluster formed by a plurality of UEs 100 which are synchronized to one another. The D2D proximity service includes a discovery procedure (Discovery) in which a proximal UE is discovered and D2D communication (Communication) that is direct UE-to-UE communication. The D2D communication is also called Direct communication.

A scenario in which all the UEs 100 forming the synchronization cluster are located inside the coverage of at least one cell is called "in network coverage" or "In coverage (InC)". A scenario in which all the UEs 100 forming the synchronization cluster are located outside the coverage of at least one cell is called "out of network coverage" or "Out of coverage (OoC)". A scenario in which some UEs 100 in the synchronization cluster are located inside the coverage of at least one cell and the remaining UEs 100 are located outside the coverage of at least one cell is called "Partial network coverage or Partial coverage".

Figure 6:
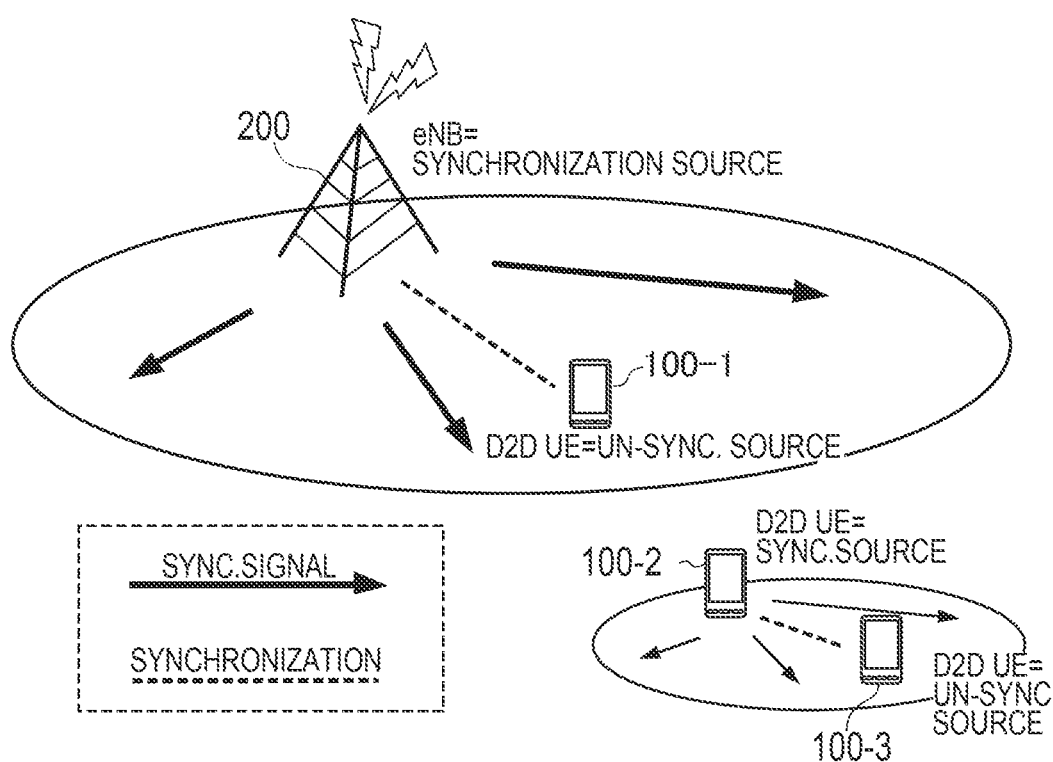
FIG. 6 is a diagram illustrating each scenario of "In coverage" and "Out of coverage".

FIG. 6 is a diagram illustrating each scenario in network coverage and out of network coverage.

As shown in FIG. 6, in network coverage, the eNB 200 is a D2D synchronization source. In the first embodiment, the D2D synchronization source (Synchronization source) indicates a node from which a D2D synchronization signal (D2DSS) is transmitted. Further, a D2D un-synchronization source (Un-Synchronization source) indicates a node from which the D2D synchronization signal is not transmitted and which synchronizes to the D2D synchronization source.

In network coverage, the eNB 200 which is a D2D synchronization source transmits, by a broadcast signal, D2D resource information (SA: Scheduling Assignment) indicating a radio resource available for the D2D proximity service, for example. The D2D resource information may be information indicating a radio resource for Discovery (hereinafter, referred to as "Discovery resource") and a radio resource for D2D communication (hereinafter, referred to as "Communication resource").

The UE 100-1 which is a D2D un-synchronization source performs Discovery and D2D communication on the basis of the D2D resource information received from the eNB 200.

On the other hand, out of network coverage, the eNB 200 is not capable of performing the above operation, and thus, a predetermined UE 100 (in FIG. 6, a UE 100-2) is a D2D synchronization source. The UE 100-2 which is a D2D synchronization source transmits the D2D resource information by a broadcast signal. A UE 100-3 which is a D2D un-synchronization source performs Discovery and D2D communication on the basis of the D2D resource information received from the UE 100-2.

Here, the D2D resource information is assumed to be notified by an SA reception resource pool which is an area of a preconfigured radio resource. Further, in order that the UE 100 is capable of receiving the D2D resource information even in out of network coverage, the information on the SA reception resource pool is assumed to be preconfigured to the UE 100.

The UE 100 includes: a storage (memory 150) in which information on an SA reception resource pool is stored; a transmitter (processor 160 and radio transceiver 110 etc.) that transmits a synchronization signal for a D2D proximity service; and a controller (processor 160) that monitors a reception state of the synchronization signal from another UE 100 and a reception state of the control signal in the control radio resources.

The UE 100 may receive the D2D resource information in a preconfigured SA resource pool, and thus, the UE 100 needs to monitor all the preconfigured SA resource pools. As shown in FIG. 7(A), the UE 100-1 and the UE 100-2 monitor a preconfigured in-network coverage SA resource pool (RX resource pool for in-coverage) and out-of-network coverage SA resource pool (RX resource pool for out-of-coverage).

When the SA resource pool is monitored, it becomes possible for the UE 100-1 and the UE 100-2 to receive the D2D resource information when the D2D resource information is designated in the SA resource pool.

However, in order to receive the D2D resource information in the SA resource pool, the UEs 100 need to be synchronized. As shown in FIG. 7(A), when the UE 100-1 and the UE 100-2 are synchronized, it is possible to receive the D2D resource designated in the SA resource pool. On the other hand, as shown in FIG. 7(B), when the UE 100-1 and the UE 100-2 are not synchronized, areas of the SA resource pool to be monitored differ, and thus, it is not possible to surely receive the D2D resource information.

There is a problem that the UE 100 consumes unnecessary power resulting from the UE 100 monitoring the SA resource pool when the UE 100 is not synchronized with another UE 100, although the UE 100 is not capable of surely receiving the D2D resource information.

Therefore, the UE 100 according to the present embodiment does not monitor the SA resource pool when the UE 100 is not synchronized to another UE 100 or when the UE 100 may not be synchronized to the other UE 100. When the UE 100 does not monitor the SA resource pool, it becomes possible to reduce the power consumption.

Specifically, when a UE 100 which is out of network coverage does not receive a D2D synchronization signal from another UE 100 and the UE 100 does not transmit a D2D synchronization signal, the UE 100 does not monitor an SA resource pool. As a result, it is possible to reduce power consumption. It is noted that the UE 100 regularly monitors the reception state of a synchronization signal and confirms whether there is a UE 100 that performs a D2D service in the vicinity.

FIG. 8 illustrates an operation of the UE 100 according to the present embodiment. The UE 100-2, which is out of network coverage (OoC), is not receiving a D2D synchronization signal from the UE 100-1, which is in network coverage (InC). Moreover, the UE 100-2 is not receiving a D2D synchronization signal from the UE 100-3, which is out of network coverage (OoC). Furthermore, the UE 100-2 is not transmitting a D2D synchronization signal. In such a case, the UE 100-2 does not monitor the in-network coverage SA resource pool and the out-of-network coverage SA resource pool.

Second Embodiment

Next, a second embodiment according to the present disclosure will be described. The description of parts in common with the first embodiment will be omitted, and only the differences will be described.

In the present embodiment, the UE 100 is assumed to be out of network coverage. The UE 100 receives a D2D synchronization signal from another UE 100 which is out of network coverage and/or the UE 100 transmits a D2D synchronization signal. When the UE 100 does not receive a synchronization signal transmitted by another UE 100 which is in network coverage, the UE 100 monitors only the out of network coverage SA resource pool, among the SA resource pools.

The UE 100 is synchronized or is very likely synchronized to another UE 100 which is out of network coverage, and thus, the UE 100 monitors the out-of-network coverage SA resource pool. On the other hand, the UE 100 is not synchronized to another UE which is in network coverage. In this case, it is less likely that designation for D2D resources is received from the other UE 100 which is in network coverage, and thus, the UE 100 does not monitor the in-network coverage SA resource.

It is noted that a notification may be provided as to whether the other UE 100 is in network coverage or is out of network coverage by using the D2D synchronization signal. A technique may be possible in which the information on "In coverage" and "Out of coverage" are included in the D2D synchronization signal. Alternatively, different formats of synchronization signal are used for "In coverage" and "Out of coverage".

Figure 9:
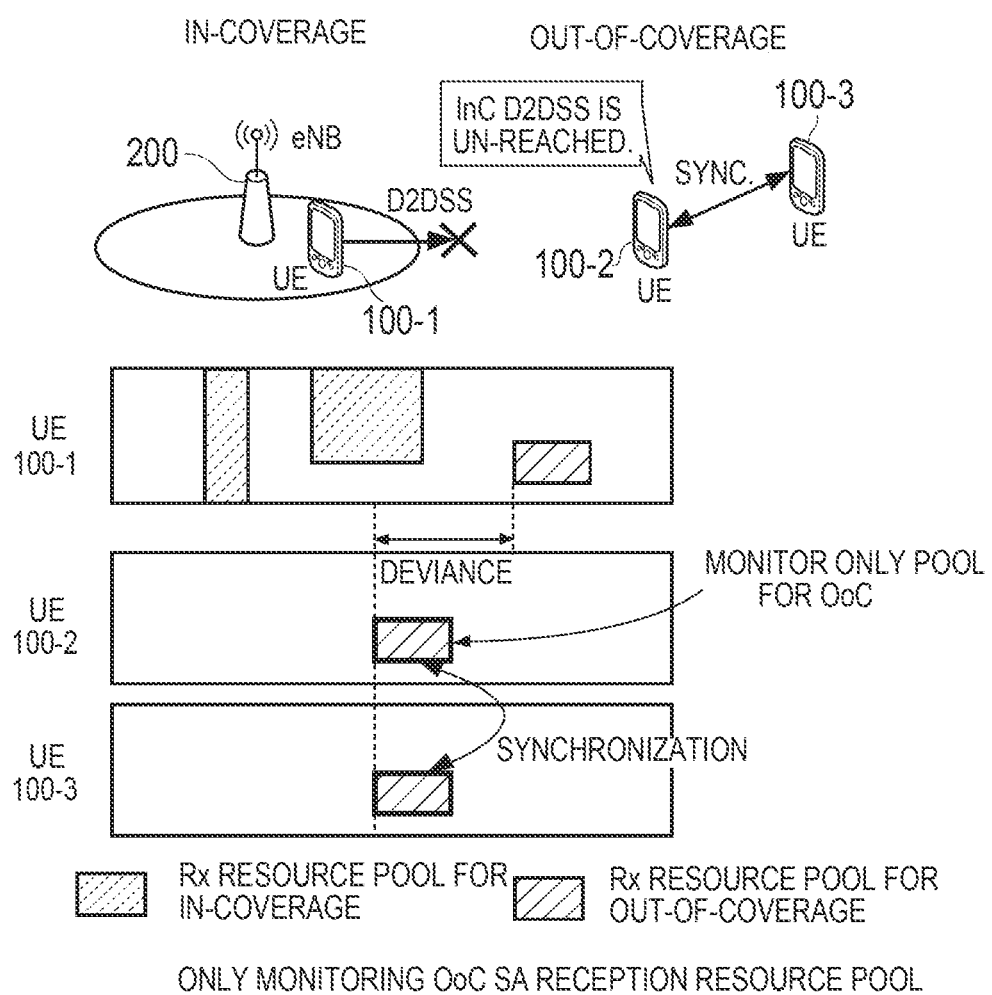
FIG. 9 is a configuration diagram of a D2D proximity service according to the second embodiment.

FIG. 9 illustrates an operation of the UE 100 according to the present embodiment. FIG. 9 is a diagram illustrating a monitoring state of an SA resource pool when the UE 100-2, which is out of network coverage (OoC), is not receiving a D2D synchronization signal from the UE 100-1, which is in network coverage (InC), and is synchronized to the UE 100-3, which is out of network coverage (OoC).

The UE 100-2 and the UE 100-3 are synchronized each other as a result of at least one of the UE 100-2 and the UE 100-3 transmitting a D2D synchronization signal.

The UE 100-2 does not receive a D2D synchronization signal from the UE 100-1, and thus, the UE 100-2 is not synchronized to the UE 100-1.

In this case, the UE 100-2 monitors the out-of-network coverage SA resource pool capable of receiving designation for D2D resources, as a result of synchronizing to the UE 100-3.

On the other hand, the UE 100-2 is not synchronized to the UE 100-1, and it is less likely that the UE 100-2 is capable of receiving designation for D2D resources, and thus, the UE 100-2 does not monitor the in network coverage SA resource.

Here, when receiving synchronization signals from a plurality of other UEs, which is out of network coverage, the UE 100 selects one of the other UEs.

Further, in a case where the UE 100 is transmitting a D2D synchronization signal, when the UE 100 receives a D2D signal from another UE 100, the UE 100 may stop transmitting the D2D synchronization signal.

Third Embodiment

Next, a third embodiment according to the present disclosure will be described. The description of parts in common with the first embodiment will be omitted, and only the differences will be described.

In the present embodiment, when the UE 100-2 is out of network coverage, the UE 100-2 receives a D2D synchronization signal from the UE 100-1, which is in network coverage. In this case, the UE 100-2 monitors the reception states of both the in-network coverage SA resource pool and the out-of-network coverage SA resource pool.

When another UE 100-3, which is out of network coverage, receives a synchronization signal from the UE 100-1 within a network, the result is that the UE 100-2 and the UE 100-3 are synchronized. In this case, even though the UE 100-2 receives designation for D2D resources from the UE 100-3 in the out-of-network coverage SA resource pool, the UE 100-2 is capable of surely receiving the signal. By assuming such a case, when the UE 100-2 is receiving a D2D synchronization signal from another UE 100-1 which is in a coverage, the UE 100-2 monitors not only the reception state of the in-network coverage SA resource pool but also that of the out-of-network coverage SA resource pool.

Figure 10:
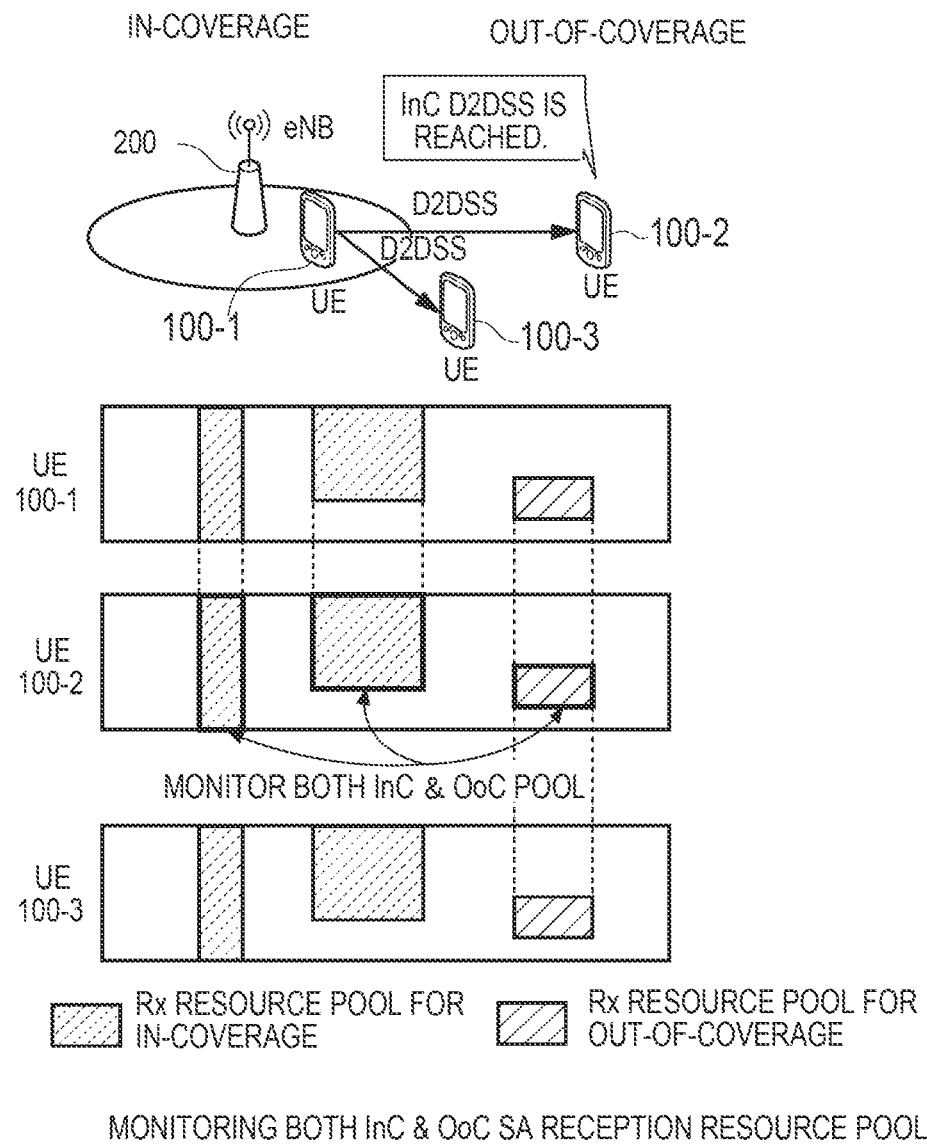
FIG. 10 is a configuration diagram of a D2D proximity service according to the third embodiment.

FIG. 10 illustrates an operation of the UE 100 according to the present embodiment. The UE 100-2, which is out of network coverage, is receiving a D2D synchronization signal from the UE 100-1, which is in network coverage. In this case, the UE 100-2 monitors the reception states of both the in-network coverage SA resource pool and the out-of-network coverage SA resource pool. This is because there is a possibility that similarly to the UE 100-2, the UE 100-3, which is out of network coverage, is receiving a D2D synchronization signal from the UE 100-1, as described above.

Here, when the UE 100-2, which is out of network coverage, receives an instruction of designating a part of the in-network coverage SA resource pool from the UE 100-1 which is in network coverage, the UE 100-2 monitors the reception states of the notified part of the in-network coverage SA resource pool and the out-of-network coverage SA resource pool.

A D2D synchronization signal or a PD2DSCH (Physical D2D Shared Channel) may be used to designate the in-network coverage SA resource pool.

Figure 11:
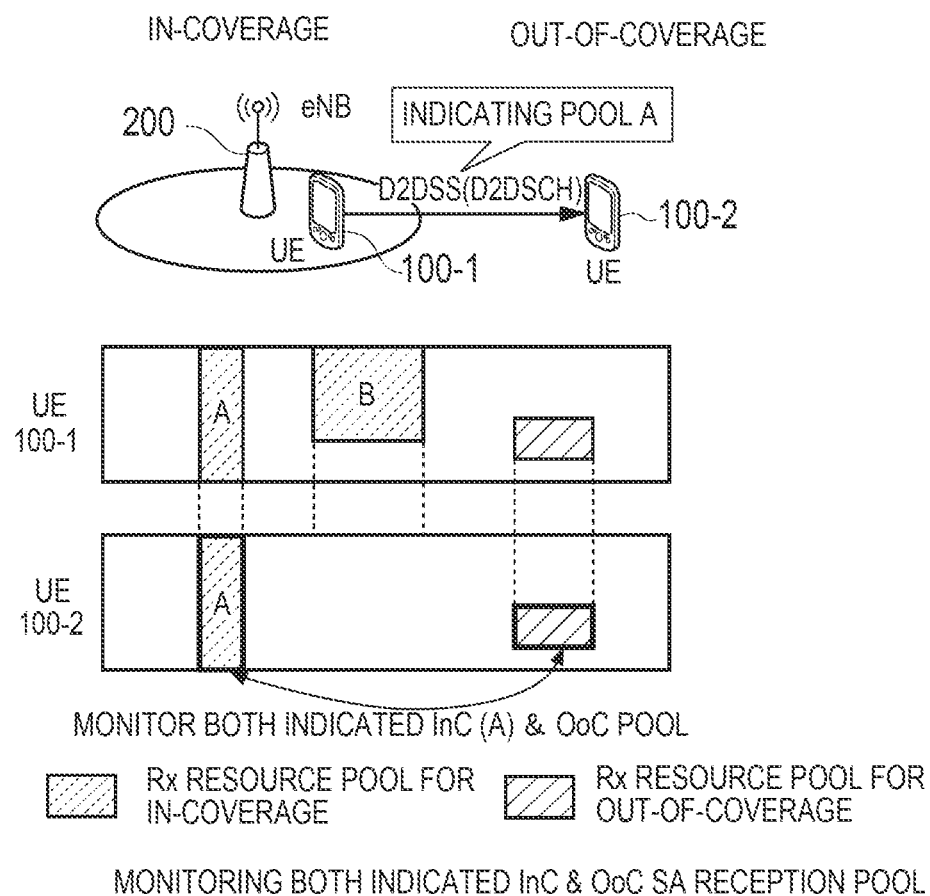
FIG. 11 is a configuration diagram of the D2D proximity service according to the third embodiment.

By using FIG. 11, the present operation will be described. Here, the UE 100-2, which is out of network coverage, receives an instruction (Indicating pool A) of monitoring a reception state of an in-network coverage SA resource pool A (RX resource pool for in-coverage A) from the UE 100-1, which is in network coverage. The UE 100-2 monitors reception of the in-network coverage SA resource pool A and the out-of-network coverage SA resource pool. The UE 100-2 does not monitor reception of an in-network coverage SA resource pool B.

It is noted that when the UE 100 receives D2D synchronization signals transmitted by a plurality of other UEs 100, which is in network coverage, the UE 100 synchronizes to a D2D synchronization signal transmitted by one of the other UE 100 among the plurality of other UEs 100, which is in network coverage.

The UE 100 may determine the other UE 100 to be synchronized, by using a signal strength of the D2D synchronization signal, a priority of the D2D synchronization signal, the size of D2D control radio resources, etc.

Further, in a case where the UE 100-2 which is out of network coverage is receiving a D2D synchronization signal transmitted from another UE 100-1 which is in network coverage, when the UE 100-2 receives a synchronization signal from another UE 100-3 which is out of network coverage, the UE 100-2 may refer to the D2D synchronization signal transmitted by the UE 100-1 to generate the D2D synchronization signal and may transmit the generated D2D synchronization signal to the UE 100-3.

With respect to the generation of the D2D synchronization signal and the transmission to the UE 100-3, the UE 100-2 may determine on the basis of a battery remaining amount of the UE 100-2 whether to generate the synchronization signal and transmit the generated synchronization signal.

Other Embodiments

It is noted that in the first to third embodiments, the operation when the UE 100 monitors the reception state of the SA resource pool for D2D is described; however, these embodiments may be applied to an operation where the UE 100 discovers the other UE for D2D (D2D Discovery).

In the embodiment described above, although an LTE system is described as an example of a mobile communication system, it is not limited to the LTE system, and the present disclosure may be applied to a system other than the LTE system.

Clearly, other modifications and manners of practicing this invention will occur readily to those of ordinary skill in the art in view of these teachings. The above description is illustrative and not restrictive. This invention is to be limited only by the following claims, which include all such modifications and manners of practice when viewed in conjunction with the above specification and accompanying drawings. The scope of the invention should, therefore, be determined not with reference to the above description, but instead should be determined with reference to the appended claims along with their full scope of equivalents.

INDUSTRIAL APPLICABILITY

The present disclosure is useful for communication fields.

The invention claimed is:

1. A user terminal which supports a D2D (Device-to-Device) proximity service enabling a direct device-to-device communication, comprising:
a controller configured to synchronize to a D2D synchronization signal transmitted by other user terminal, when the user terminal receives D2D synchronization signals transmitted by the other user terminal in a case where the user terminal is out of coverage, wherein
a D2D communication resource pool to be used for direct D2D communication defined by 3rd generation partnership project (3GPP) standards includes first time and frequency resources used by one or more user terminals in coverage and second time and frequency resources used by one or more user terminals out of coverage, wherein the second time and frequency resources are preconfigured;
the controller configured to monitor reception in the second time and frequency resources in a case where the user terminal is out of coverage.

2. The user terminal according to claim 1, wherein the other user terminal is out of coverage.

3. The user terminal according to claim 1, wherein the other user terminal is in network coverage.

4. The user terminal according to claim 1, when the user terminal receives D2D synchronization signals transmitted by a plurality of other user terminals,
wherein the controller is configured to select one of the D2D synchronization signals based on a signal strength of each D2D synchronization signal, and synchronize to the selected D2D synchronization signal.

5. An apparatus for controlling a user terminal which supports a D2D (Device-to-Device) proximity service enabling a direct device-to-device communication, comprising:
a processor configured
to synchronize to a D2D synchronization signal transmitted by other user terminal, when the user terminal receives D2D synchronization signals transmitted by the other user terminals in a case where the user terminal is out of coverage,
wherein a D2D communication resource pool to be used for direct D2D communication defined by 3rd generation partnership project (3GPP) standards includes first time and frequency resources used by one or more terminals in coverage and second time and frequency resources used by one or more terminals out of coverage, wherein the second time and frequency resources are preconfigured; and
to monitor reception in the second time and frequency resources in a case where the user terminal is out of coverage.

6. A user terminal which supports a D2D (Device-to-Device) proximity service enabling a direct device-to-device communication, comprising:
a controller configured to synchronize to a D2D synchronization signal transmitted by other user terminal, when the user terminal receives D2D synchronization signals transmitted by the other user terminal in coverage, in a case where the user terminal is out of coverage, wherein
a D2D communication resource pool to be used for direct D2D communication defined by 3rd generation partnership project (3GPP) standards includes first time and frequency resources used by one or more user terminals in coverage and preconfigured second time and frequency resources used by one or more user terminals out of coverage, wherein the second time and frequency resources are preconfigured;
the controller is configured to monitor reception in the preconfigured second time and frequency resources, even in a case where the user terminal is synchronizing with the D2D synchronization signals transmitted by the other user terminal in coverage while the user terminal is out of coverage.

* * * * *